UNITED STATES PATENT OFFICE.

JAMES C. ANDERSON, OF HIGHLAND PARK, ILLINOIS.

BRICKS, &c., INCRUSTED WITH METAL.

SPECIFICATION forming part of Letters Patent No. 401,097, dated April 9, 1889.

Application filed November 30, 1888. Serial No. 292,308. (Specimens.)

*To all whom it may concern:*

Be it known that I, JAMES C. ANDERSON, a citizen of the United States, residing at Highland Park, in the county of Lake and State of Illinois, have invented new and useful Improvements in Bricks, Blocks, Tiles, &c., Incrusted with Metals; and I do hereby declare the following to be a full, clear, and exact description of said invention.

My invention relates to improvements in bricks, blocks, tiles, &c., incrusted with metals.

My invention consists of a brick, block, or tile as a new article of manufacture having a metallic incrustation or casing formed integral with the same.

In an application filed by me of even date herewith, Serial No. 292,309, I have claimed the method of producing the metallic incrustations, the prime object of my invention being to provide such articles with an integral overcrusting which shall not only provide an effectual barrier to osmotic action incident to such articles when exposed to the weather on the outer walls of buildings, but a wearing-surface for the inner walls and flooring of buildings to prevent the attrition incident to walls and the wearing incident to the floors, and to prevent the same from being marred, worn, or destroyed; and to this end I have succeeded in producing such articles the surfaces of which are covered with an incrusting envelope or shell of pure metals, said metals being fused onto and into the body of said clay articles so firmly as to become an integral part of the clay bodies into which the metallic crusting or shell is engrafted, so that in practice and in fact there is no distinguishable line between the metallic crusting and the clay body at the points of union between said bodies, and no action incident to the use of such bricks, blocks, or tiles—such as exposure to the weather—can possibly disturb the point of union between the bodies so engrafted, and the crust so provided presents as complete a weathering, attrition, and wearing surface as the various metals themselves out of which the crust is made and much harder than if such metals were used in the shape of bars, plates, or blocks.

In producing bricks, blocks, and tiles, &c., in accordance with my invention I use the whole range of metals, either singly or in combination, for coating the block, selecting such of them as are best adapted for the purpose and use to which they are applied—as, for instance, if I desire to provide the outer walls of a building with the metallic coating to resist the action of the weather and to prevent the moisture from entering from without into the walls of the building or the salts from the mortar from penetrating the walls of the building from the inner walls to the outer surface thereof I prefer to use the softer metals and those that will present the greatest degree of ornamentation and be less liable to corrosion, and in like manner in providing a coating for the inside of the building I may use the metals more liable to corrosion, yet susceptible to a higher degree of ornamentation, and in coating or incrusting the blocks or tiles for the floors of the building I prefer to use aluminum, which metal is well known to resist to the fullest extent attrition by wear—such as the treading incident to floors, the treads of stairs, &c.—and although this metal is refractory in the highest degree I have succeeded in incrusting with said metal as effectively and as practically as with the less refractory metals. The other hard metals—iron, zinc, copper, and tin, or the alloys of these or of other metals—may be used effectively for flooring purposes; but the aluminum, either alone or alloyed with other metals, may be used to the best advantage, on account of its non-corrosive property as well as its hardness. In fact, the whole range of metal alloys may be used to give variable results in the coating as to character in wearing-surfaces, as well as to æsthetic beauty.

In carrying out my invention the bricks, blocks, or tiles are by preference molded in the usual manner practiced by me in the manufacture of press building bricks, blocks, &c., molded from dry clay, as described in various patents granted to me for such purposes. In the case of bricks, blocks, &c., it is understood that the articles to be coated are first molded or pressed into form in the usual manner ready to be placed in the kilns for burning, and while in this state, before any burning has taken place or while they are being placed in the kilns for this purpose, I take the metal of whatever kind desired, which has been previously prepared into a powdered, semi-powdered, or granulated condition, and sprinkle the same over the surface of the brick to be incrusted; or, if desired, the union of several metals may enter into combination either as an alloy or as a distinctive ornamentation. I mix the powdered or granulated metals together and sprinkle the powder on the surface to be incrusted. Then the process of firing or burning takes place in the usual manner for converting such bricks or blocks from the clay state into that of pottery, which causes the powdered or granulated metals to become fused and incorporated with the clay body as an integral part thereof.

I have so far described a coating of the metals alone, singly or in union with other metals, yet I do use advantageously with said metals for rendering them more liquid and luminous finely divided or powdered borax, such powdered borax being intermingled with the metallic powders; or, I may use any of the metallic fluxes in the powdered state, commingling in like manner with the metals, and I may also use the various metallic oxides for giving the color-tints in ornamenting the articles.

In setting or placing the brick, block, or tile in the kilns, where the metals only are used for the incrustation, the bricks or blocks may be placed one on the other face to face, in the manner of setting such articles in the kilns for burning; but where the borax or other fluxes are used, which renders the metals more fluid, the bricks or blocks should be placed in seggars or upon shelves with the face or incrusted part upward, so as to prevent the sticking and clinging together of the respective bricks.

In referring to the adaptability of the various metals for forming the incrustations for weather exposure and the liability of the lower grade or baser metals to corrosion and rust, I do not wish to be understood to admit the liability of the crust or facings to rust or corrode in the ordinary sense when so deposited on the bricks, blocks, &c., for it is found to be in a state to resist such corrosion in the highest degree, and therefore the rust or corrosion referred to is meant relatively.

While I have described as the best method of applying the incrustation to be while the bricks are in a green or unburned condition, yet I do not wish to limit myself to this particular way of doing it, for good results may be obtained by applying the incrusting materials to bricks which have been previously burned, and then subjecting the bricks to a second firing to fuse the metals.

I am aware that it is not new to cement metallic or other bodies onto a matrix composed of a clay body by means of an intervening vitrifiable material, and such I do not claim.

What I claim is—

As a new article of manufacture, a brick or tile having a metallic incrustation formed integral with the same without an intermediate vitrifiable material.

In testimony whereof I affix my signature in the presence of two subscribing witnesses.

J. C. ANDERSON.

Witnesses:
L. W. SINSABAUGH,
H. M. STERLING.